Figure 1:
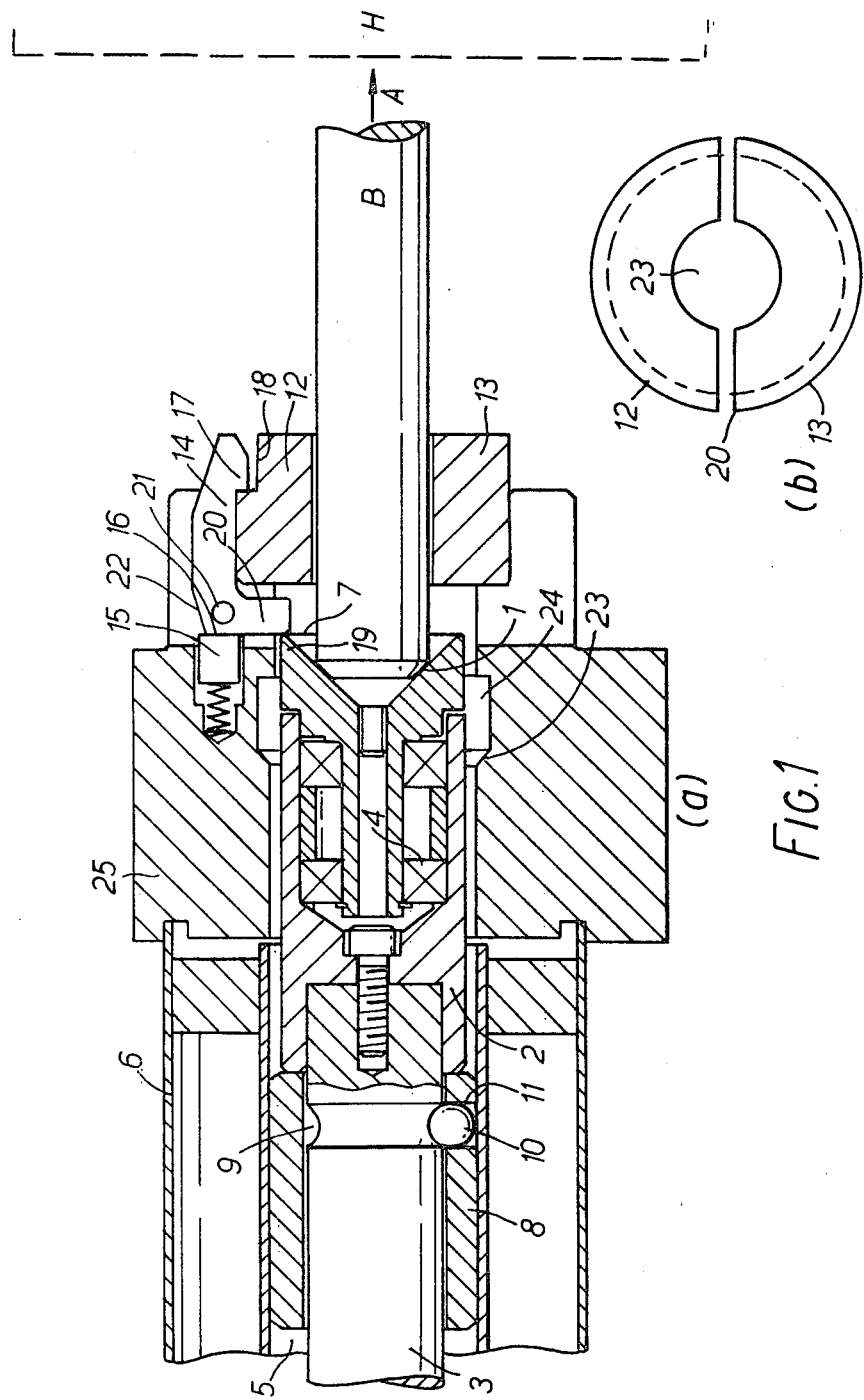

United States Patent [19]
Love

[11] 4,376,398
[45] Mar. 15, 1983

[54] BAR FEED

[75] Inventor: Douglas S. Love, Hartfield, England

[73] Assignee: E M I Limited, Hayes, England

[21] Appl. No.: 182,591

[22] Filed: Aug. 29, 1980

[30] Foreign Application Priority Data

Sep. 3, 1979 [GB] United Kingdom ................ 7939510

[51] Int. Cl.³ .................... B23B 13/02; B23B 13/08
[52] U.S. Cl. ................................... 82/2.5; 414/18; 414/17
[58] Field of Search ............... 82/2.5, 2.7, 38 A; 414/17, 18

[56] References Cited

U.S. PATENT DOCUMENTS

| 2,572,741 | 10/1951 | McCoy | 414/17 |
| 3,693,810 | 9/1972 | Gumhold | 82/2.7 |
| 3,889,822 | 6/1975 | Ross | 414/18 |
| 4,048,879 | 9/1977 | Cox | 82/2.5 |
| 4,129,220 | 12/1978 | Peterson et al. | 82/2.5 |

FOREIGN PATENT DOCUMENTS 2528130 1/1976 Fed. Rep. of Germany .
326244 1/1958 Switzerland ................ 414/18
952974 3/1964 United Kingdom .

*Primary Examiner*—Leonidas Vlachos
*Attorney, Agent, or Firm*—Fleit, Jacobson & Cohn

[57] ABSTRACT

A bar stock feed arrangement for an automatic machine tool, in which a pusher rod, movable along the axis of a feed tube to advance the bar stock, is supported by an annular collar. While the pusher rod remains within the feed tube the collar is locked to the rod by means of a ball and socket arrangement. To permit the pusher rod to emerge from the feed tube the locking action is removed, the collar still assuming a supportive role at the end of the feed tube. Additional supportive means, in the form of split bushings, and a sound damping arrangement are also described.

4 Claims, 6 Drawing Figures

BAR FEED

This invention relates to bar stock feed arrangements for lathes, and especially although not exclusively, to bar stock feed arrangements for automatic lathes.

Commonly the bar stock used in a lathe is contained within a hollow feed tube and is advanced, by a pusher rod, towards the lathe headstock where it is clamped by the chuck, which provides the rotation necessary for machining.

For the economical operation of a lathe the bar stock may be of a considerable length (typically up to about 4 meters) and the pusher rod which advances the bar stock along the axis of the lathe may be of a similar length. During rotation there is a tendency for the bar stock, particularly if it has a small diameter (less than 1¾", say) to perform a whipping action, which can result in jarring of the feed tube and the generation of excessive noise and vibration.

Whilst the noise may perhaps be tolerated, the sustained jarring and vibration may eventually cause the feed tube to crack, necessitating its replacement.

It is preferable, therefore, for both the bar stock and pusher rod to be supported centrally within the feed tube so that the jarring is reduced. In a hitherto proposed arrangement, described in BP No. 952,974, limited support to the bar stock is provided, although this support is removed once the bar has emerged fully from the feed tube.

It is an object of the present invention to provide an improved form of bar stock feed arrangement.

According to the invention there is provided a bar stock feed arrangement comprising a housing having an axial bore, a pusher rod adapted to engage bar stock and a drive means for moving the pusher rod along the bore to thereby advance the bar stock, the arrangement also comprising an annular collar for maintaining the pusher rod in coaxial relationship with the bore, the pusher rod and collar having respectively a circumferential recess and a radially extending aperture for accommodating a locking member so as to prevent their relative axial movement, while said member is so accommodated, the bore also having a recess located to communicate with the aperture in one position of the collar so that when the collar assumes said one position the recess partially accommodates the locking member so as to permit relative axial movement of the collar and pusher rod, the collar being maintained at said one position by the action of the locking member to thereby provide support for the pusher rod.

Figure 2:
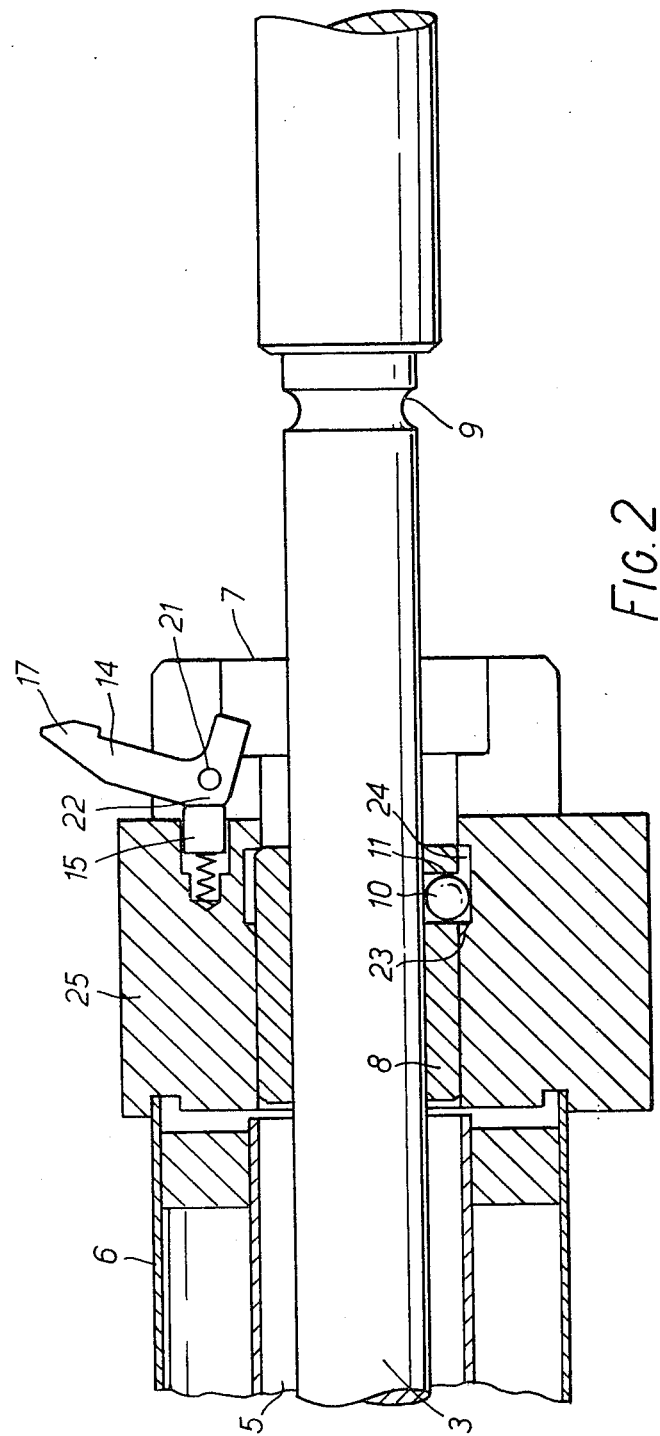
Figure 3:
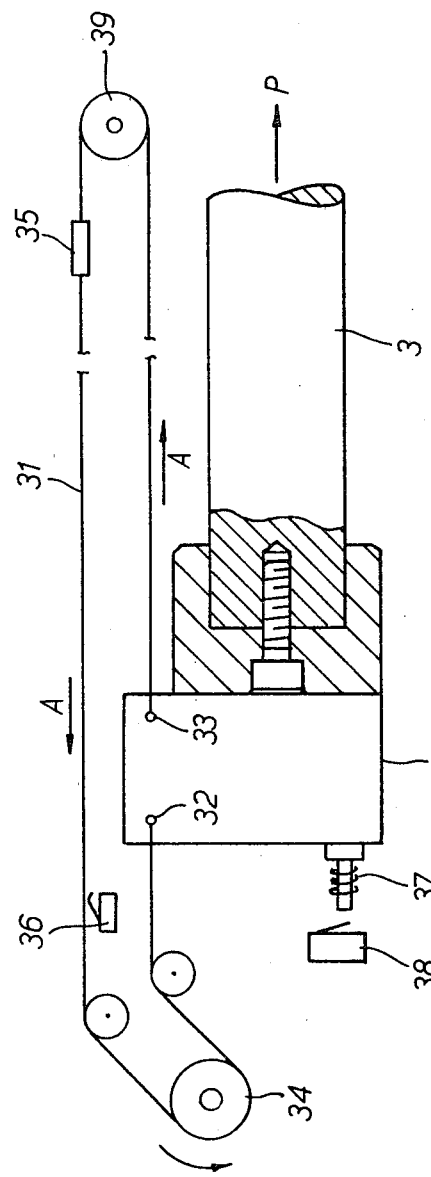
Figure 4:
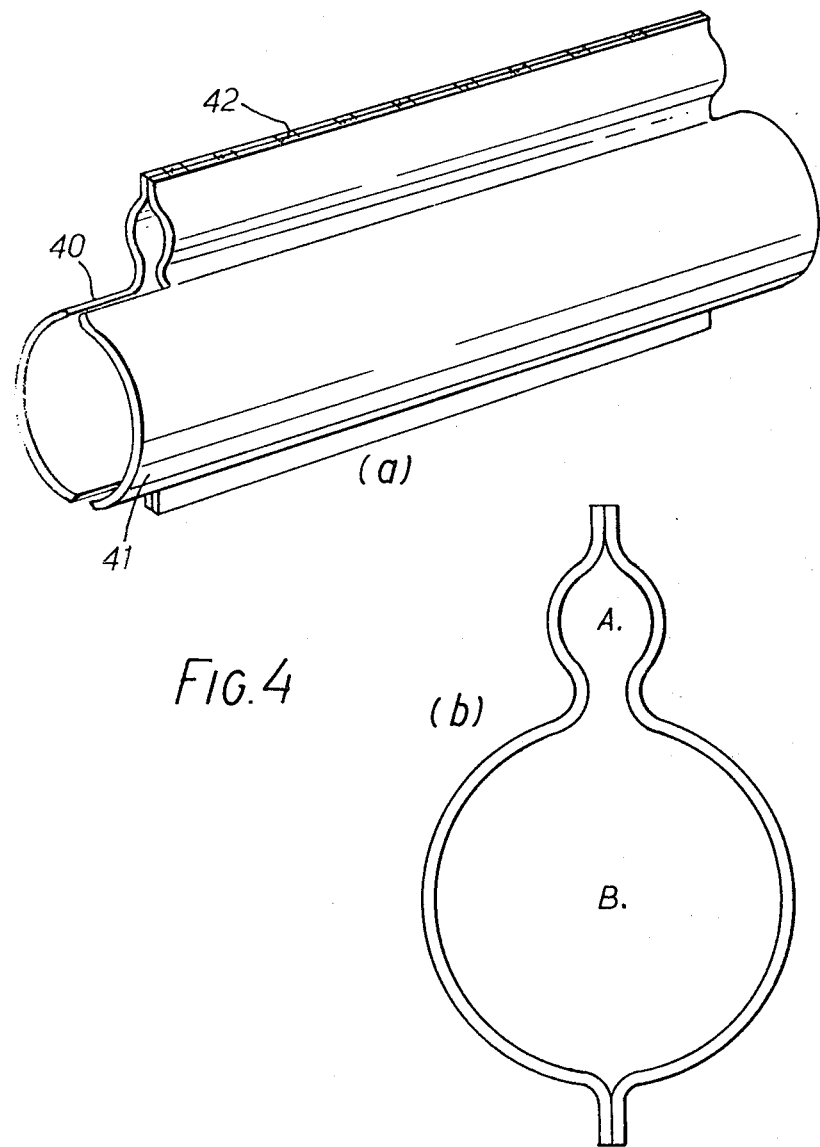
Figure 5:
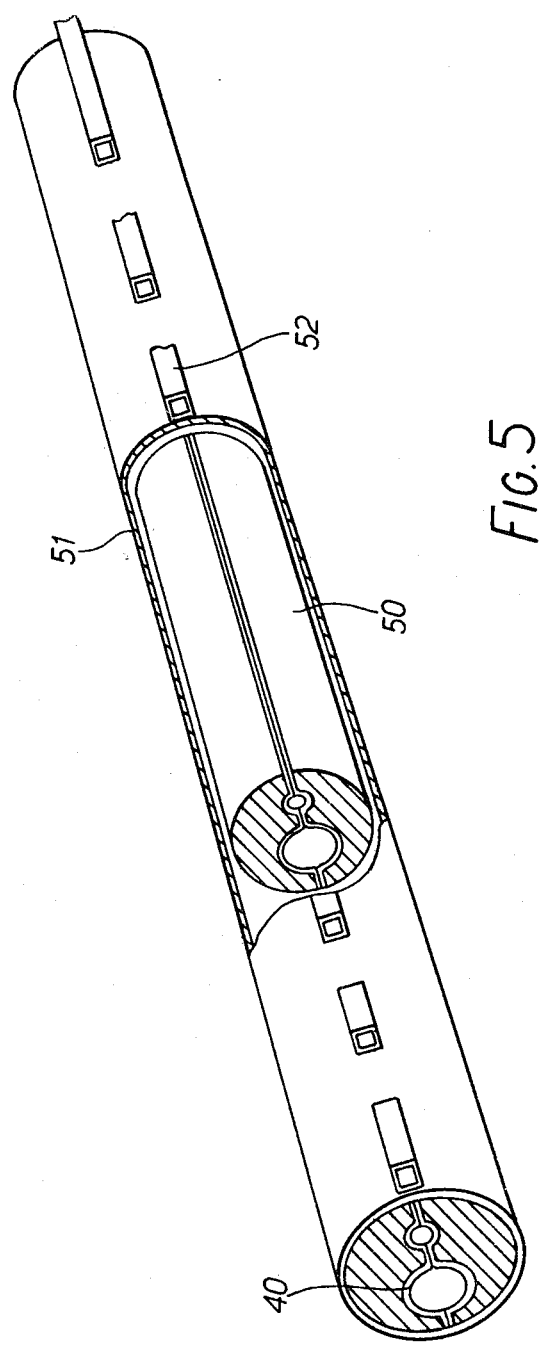

In order that the invention may be more fully understood it will be described by way of example by reference to the accompanying drawings of which, FIG. 1 shows a vertical section through the output end of the feed arrangement lying closest to the lathe headstock, FIG. 2 shows substantially the same vertical section, in which the arrangement assumes a different mode of operation, FIG. 3 shows a vertical section through the end of the feed arrangment, furthest away from the headstock, and illustrates the drive means for the arrangement, FIGS. 4a and 4b, respectively show end and perspective views of the tube containing the arrangement of FIG. 3, and FIG. 5 shows a perspective view of the feed arrangement incorporating the tube of FIG. 4 and illustrating the positioning of a polyurethane shock absorber.

Although the arrangement described throughout the remainder of this specification is capable of handling stock of up to four meters long and up to 2 inches in diameter it will be appreciated that the present invention is not limited to this particular example.

Referring to FIG. 1a of the drawings, the bar stock is represented at B, and engages a tapered socket, 1, which forms part of the end piece, 2, of a pusher rod, which is also about 4 meters long and of which only a short section is shown at 3. A ball race, 4, prevents the rotation of the bar being transmitted back to the pusher rod. The pusher rod is accommodated within the central bore, 5, of the housing of a feed tube, 6, whose length is sufficient to accommodate not only the pusher rod itself, but also a substantial length of bar stock. Thus, when the arrangement has been recharged by the introduction of a new length of stock, most of this length is contained within the feed tube and the excess extends between the end, 7, of the feed tube and the headstock, shown schematically at H.

The pusher rod is capable of advancing the bar stock in the direction of the arrow, A, so that as machining progresses and the bar stock is depleted, fresh material can be advanced to the machining position. This is achieved by a drive means which will be described below by reference to FIG. 3.

In this invention a short annular collar, 8, made of hard cast steel maintains the pusher rod centrally within the bore of the feed tube, but also permits axial movement of the rod along the bore. The rod, 3, has a circumferential recess, 9, which is shaped to partially accommodate a steel sphere, 10. The collar, 8, has a corresponding radially extending aperture, 11, which is arranged so that when the sphere is enclosed by the cavity formed by the recess and aperture, the collar is locked to the pusher rod and is constrained to move therewith along the bore.

The bar stock is also supported, outside the feed tube, by split bushes, 12 and 13, which are shown in the end view of FIG. 1b. The bushes which are typically made of nylon or alternatively polyurethane, are held in position around the bar, B, using three cam levers which are spaced uniformly around the axis of the bore. One such lever is shown at 14 in FIG. 1a. Each lever is biassed by a spring loaded bolt, 15, which engages the edge, 16, so that a centrally extending projection, 17, latches over a corresponding recess, 18, in the bush. The three levers, therefore, cooperate to maintain the split bushes, 12 and 13, in their supportive positions, as shown in FIG. 1a. It will be appreciated that the size of the central hole, 23, through which the bar stock is free to pass, can be selected to match the diameter of the bar stock in use.

When the pusher rod reaches the position shown in FIG. 1a, advancement of the bar stock may only be continued provided the socket, 1, which engages the bar, is permitted to emerge from the end, 7, of the feed tube, and so it is necessary to effect removal of the bushes, 12 and 13. To this end the tip, 19, of the socket, 1, engages the extreme end, 20, of the lever and exerts a turning moment about the pivot point, 21, sufficient to overcome the bias applied to the lever by the bolt, 15. The levers then snap open to assume the open condition shown in FIG. 2, and each bolt engages a respective lever at the edge, 22. Further movement of the pusher rod causes the end piece, 2, to engage the bushes, which then fall away from their supportive position around the bar. To prevent the bushes falling too far, however, they are attached to the body of the feed arrangement by means of chains or flexible cables.

As the collar, 8, approaches the end, 7, of the bore, the sphere, 10, disengages the pusher rod and moves into a closed recess, 24, within the wall of the feed tube housing, 25, thereby locking the collar in the fixed position shown in FIG. 2. The pusher rod, however, is still free to move axially along the bore but is nevertheless supported by the collar. When the bar stock has been exhausted and the pusher rod has reached its fully extended position, the rod is retracted, and moves in the direction from right to left in the drawing. The end piece, 2, of the pusher rod reengages the collar and pushes it back along the tube and the sphere, 10, is forced up the inclined edge, 23, of the recess, 24, and again assumes the locking position within the cavity formed by the recess, 9, and the aperture, 11, in the collar.

FIG. 3 of the drawings shows the end of the pusher rod which lies furthest away from the lathe headstock. The rod is attached to an end plate, 30, which is coupled to a driving chain, 31, at the positions, 32 and 33. The rod is shown in its fully retracted position i.e. before the bar stock has been advanced. Anticlockwise rotation of the sprocket, 34, causes the chain, 31, to move in the direction of the arrows, A, which in turn causes the pusher rod to move in the direction of the arrow, P, towards the headstock. When the rod has been fully advanced and the entire bar stock has been exhausted a slug, 35, engages a microswitch, 36, which causes the drive sprocket, 34, to reverse direction. The rod is thereby caused to retract until a spring loaded pin, 37, engages a further microswitch, 38, which stops the rod in the fully retracted position. The chain drive is shown in FIG. 3 on a greatly reduced scale and in practice the distance between the drive sprocket, 34, and the jockey, 39, is of the order of 4 meters.

FIG. 4a shows a perspective view of the tube which houses the pusher rod and the drive means. As is shown more clearly in the cross-sectional view of FIG. 4b, the tube is comprised of two linked circular passages, A and B. The upper passage, A, accommodates the chain drive and the narrow end plate, 30, is accommodated within the intermediate region linking the passages, A and B. The lower passage, B, accommodates the pusher rod, 3. As indicated in FIG. 4a the shaped tube is formed of two pressed sheet members, 40 and 41, which are tag welded at discrete postions (e.g. 42) along the upper and lower joins. This arrangement is found to be much less prone to cracking than is a tube formed by a casting technique.

As discussed earlier the vibrational noise transmitted along the feed tube by the rotating stock bar can be excessive. To substantially minimise this problem the inner tube, which forms the central bore of the arrangement and may be of the type described above by reference to FIG. 4, is contained within an outer tube and the intermediate region is filled with sections of a sound damping material such as expanded polyurethane, for example. These sections are placed at intervals along the feed tube as shown at 50 in FIG. 5, for example. The inner tube which forms the bore of the arrangment is shown at 40 and the outer tube is shown at 51. A further passage, 52, is also provided which houses the supply cables to the drive means.

By adopting the techniques described above, namely the use of the supportive collar and split bushes and the provision of a sound damping material between the inner and outer members of the feed tube, the vibration and noise transmitted along the arrangement is considerably reduced.

What I claim is:
1. A bar stock feed arrangement comprising a housing having an axial bore, a pusher rod adapted to engage bar stock and a drive means for moving the pusher rod along the bore to thereby advance the bar stock, a plurality of removable support blocks capable of being maintained in a configuration appropriate for supporting bar stock protruding from the housing, a plurality of symmetrically disposed levers pivotably mounted to said housing, and means for resiliently biasing each lever to urge the support blocks into their supportive configuration, the arrangement also comprising an annular collar for maintaining the pusher rod in coaxial relationship with the bore, the pusher rod and collar having respectively a circumferential recess and a radially extending aperture for accommodating a sphere capable of preventing their relative axial movement, while said sphere is so accommodated, the bore also having a recess located to communicate with the aperture in one position of the collar so that when the collar assumes said one position the recess partially accommodates the sphere so as to permit relative axial movement of the collar and pusher rod, the collar being maintained at said one position by the action of the sphere, and thereby provides support for the pusher rod.

2. A bar stock feed arrangement according to claim 1 wherein the drive means acts in one sense appropriate for advancing bar stock engaged by the pusher rod and in the opposite sense appropriate for returning the pusher rod to a location suitable for receiving a charge of bar stock, and wherein the pusher rod has a projection for engaging the collar and urging it away from said one position when the drive means acts in the said opposite sense.

3. A bar stock feed arrangement comprising a housing having an axial bore, a pusher rod adapted to engage bar stock, an annular collar for maintaining the pusher rod in coaxial relationship with the bore and a drive means for moving the pusher rod along the bore arranged to act in one sense appropriate for advancing bar stock engaged by the pusher rod and in an opposite sense appropriate for returning the pusher rod to a location suitable for receiving a charge of bar stock; the pusher rod and collar having respectively a circumferential recess and a radially extending aperture for accommodating a sphere capable of preventing their relative axial movement while said sphere is so accommodated, the bore also having a recess with an inclined side wall permitting entry and exit of the sphere, located to communicate with the aperture in one position of the collar so that when the collar assumes said one position the recess partially accommodates the sphere so as to permit relative axial movement of the collar and pusher rod, the collar being maintained at said one position by the action of the sphere to thereby provide support for the pusher rod and being urged away from said one position by a projection on the pusher rod when the drive means acts in said opposite sense, the arrangement also including a plurality of support blocks capable of being maintained in a configuration appropriate for supporting bar stock protruding from said housing, a plurality of symetrically disposed levers, pivotally mounted to the housing, and means for resiliently biassing each lever to urge the support blocks into their supportive configuration.

4. A bar stock feed arrangement according to claim 3 wherein the said housing is contained axially within a tube, the region between the tube and housing being filled with a sound damping material.

* * * * *

UNITED STATES PATENT AND TRADEMARK OFFICE
CERTIFICATE OF CORRECTION

PATENT NO. : 4,376,398
DATED : March 15, 1983
INVENTOR(S) : Douglas S. LOVE

It is certified that error appears in the above-identified patent and that said Letters Patent are hereby corrected as shown below:

On the title page, before line [51] insert:

Sep.3, 1979 [GB] United Kingdom .......... 7930510

Signed and Sealed this

Twelfth Day of July 1983

[SEAL]

Attest:

GERALD J. MOSSINGHOFF

Attesting Officer

Commissioner of Patents and Trademarks